United States Patent [19]

Yamaguchi et al.

[11] Patent Number: 5,052,991
[45] Date of Patent: Oct. 1, 1991

[54] PLANETARY GEAR OF AUTOMATIC TRANSMISSION

[75] Inventors: Kozo Yamaguchi; Toyoji Negi; Tadashi Kondo; Kunihiro Iwatuki, all of Aichi, Japan

[73] Assignees: Aisin-AW Kabushiki Kaisha; Toyota Jidosha Kabushiki Kaisha, Japan

[21] Appl. No.: 510,190

[22] Filed: Apr. 17, 1990

[30] Foreign Application Priority Data

Apr. 19, 1989 [JP] Japan .................................. 1-99277

[51] Int. Cl.$^5$ ............................................. F16H 1/28
[52] U.S. Cl. ..................................... 475/344; 74/410; 475/255
[58] Field of Search ...................... 74/573 R, 574, 410, 74/454; 475/344, 331, 337, 338, 181, 267

[56] References Cited

U.S. PATENT DOCUMENTS

| | | | |
|---|---|---|---|
| 1,388,897 | 8/1921 | Schmidt | 74/410 |
| 3,655,021 | 4/1972 | Froio | 475/255 |
| 4,222,289 | 9/1980 | Watanabe | 74/740 |

*Primary Examiner*—Allan D. Herrmann
*Assistant Examiner*—William Trousdell
*Attorney, Agent, or Firm*—Lorusso & Loud

[57] ABSTRACT

In an overdrive planetary gear unit of an automatic transmission, a helical planetary pinion has its front portion cut to form an cutout portion and to have an axial-direction cross section asymmetrical in the direction of its rotation axis in order to uniformize, in the axial direction, the load imposed upon a bearing disposed around the circumference of the pinion shaft.

In a front planetary gear unit of a main transmission of the automatic transmission, a helical planetary pinion has its rear portion cut to form an cutout portion and to have an axial-direction cross section asymmetrical in the direction of its rotation axis in order to uniformize the load imposed upon a bearing disposed around the circumference of the pinion shaft.

It is thereby possible to reduce the weight of each planetary pinion and, hence, the centrifugal force acting on the pinion. In the overdrive planetary gear unit, the center of gravity of the planetary pinion is shifted toward the rear end of the pinion, and the centrifugal force acting on this pinion is therefore smaller at the front end, thereby reducing the load imposed on the bearing at the front end. In the front planetary pinion gear unit of the main transmission unit, the center of gravity of the planetary pinion is shifted toward the front end, and the centrifugal force is therefore smaller at the rear end, thereby reducing the load imposed on the bearing at the rear end. The non-uniformity of the load on each bearing in the axial direction is thereby reduced.

15 Claims, 7 Drawing Sheets

(PRIOR ART)

(PRIOR ART)

Fig. 12

| POSITION | | CLUTCH | | | BRAKE | | | | O W C | | |
|---|---|---|---|---|---|---|---|---|---|---|---|
| | | C₁ | C₂ | Co | B₁ | B₂ | B₃ | Bo | F₁ | F₂ | Fo |
| P | | × | × | ○ | × | × | × | × | × | × | × |
| R | | × | ○ | ○ | × | × | ○ | × | × | × | ○ |
| R (V≧9) | | × | × | ○ | × | × | × | × | × | × | ○ |
| N | | × | × | ○ | × | × | × | × | × | × | × |
| D | 1 ST | ○ | × | ○ | × | × | × | × | × | ⊗ | ○ |
| | 2 ND | ○ | × | ○ | × | ○ | × | × | ⊗ | × | ○ |
| | 3 RD | ○ | ○ | ○ | × | ○ | × | × | × | × | ○ |
| | 4 TH | ○ | ○ | × | × | ○ | × | ○ | × | × | × |
| 2 | 1 ST | ○ | × | ○ | × | × | × | × | × | ⊗ | ○ |
| | 2 ND | ○ | × | ○ | ○ | ○ | × | × | ○ | × | ○ |
| | 3 RD | ○ | ○ | ○ | × | ○ | × | × | × | × | ○ |
| | (3 RD) | ○ | ○ | ○ | × | ○ | × | × | × | × | ○ |
| L | 1 ST | ○ | × | ○ | × | × | ○ | × | × | ○ | ○ |
| | 2 ND | ○ | × | ○ | ○ | ○ | × | × | ○ | × | ○ |
| | (1 ST) | ○ | × | ○ | × | × | ○ | × | × | ○ | ○ |

| SYMBOLS | | | |
|---|---|---|---|
| ○ | ON | ENGAGED | LOCKED |
| × | OFF | RELEASED | FREE |
| ◎ | ON : L-UP ON<br>OFF : L-UP OFF | | — |
| ⊗ | | | FREE DURING COASTING |

PLANETARY GEAR OF AUTOMATIC TRANSMISSION

BACKGROUND OF THE INVENTION

This invention relates to an automatic transmission with a planetary gear unit (planetary gear speed change mechanism) for use in vehicles such as automobiles and, more particularly, to a planetary pinion of the planetary gear unit.

Referring to FIG. 1, an automatic transmission 1 has an input shaft 12 through which a torque output from a torque converter is input. The automatic transmission 1 also has an overdrive planetary gear unit 13 connected to the input shaft 12, and a main transmission unit 16 having a front planetary gear unit 14 and a rear planetary gear unit 15.

The overdrive planetary gear unit 13 includes a carrier 18 which is connected to the input shaft 12 and on which a planetary pinion 17 is supported, a sun gear 19 encircling the input shaft 12, and a ring gear 21 connected to an input shaft 20 of the main transmission unit 16.

The front planetary gear unit 14 has an output shaft 22, a carrier 24, a sun gear 25a and a ring gear 26, and other members. The rear planetary gear unit 15 has a planetary pinion 27, a sun gear 25b, a carrier 28, a ring gear 29 and other members.

An overdrive direct clutch $C_0$ and a one-way clutch $F_0$ are provided in parallel with each other between the carrier 18 and the sun gear 19. Power transmission between the carrier 18 and the sun gear 19 is effected through the overdrive direct clutch $C_0$ when the overdrive direct clutch $C_0$ is actuated, or power is transmitted in one direction alone through the one-way clutch $F_0$ when the overdrive direct clutch $C_0$ is not actuated. An overdrive brake $B_0$ is provided between the sun gear 19 and a case 6.

The carrier 24 of the front planetary gear unit 14 is connected to the output shaft 22 and supports a planetary pinion 23. The sun gear 25a of the front planetary gear unit 14 is integrally combined with the sun gear 25b of the rear planetary gear unit 15 by a connecting member 25 which encircles the output shaft 22. The ring gear 26 of the front planetary gear unit 14 is connected to the input shaft 20 through a forward clutch $C_1$. A direct clutch $C_2$ is provided between the input shaft 20 and the sun gear 25a, and a second coast brake $B_1$ consisting of a band brake is provided between the sun gear 25a and the case 6.

A second brake $B_2$ which is of a multi-plate type is provided between the sun gear 25a and the case 6. A one way clutch $F_1$ is connected between the second brake $B_2$ and the sun gear 25a.

The rear planetary gear unit 15 includes the carrier 28 on which the planetary pinion 27 is supported, the sun gear 25b, and the ring gear 29 connected to the output shaft 22. A 1st- & Rev brake $B_3$ and a one-way clutch $F_2$ are provided in parallel with each other between the carrier 28 and the case 6.

An overdrive brake $B_0$ is provided between the sun gear 19 and the case 6. Further, an optical or magnetic non-contact type speed sensor 31 is provided on the case 6. The speed sensor 31 detects the rotational speed of the input shaft 12 when the overdrive direct clutch $C_0$ is engaged, that is, the transmission operates at first, second or third speed.

A rotational speed detection sensor 33 for detecting the rotation of the output shaft 22 is provided to prepare a control parameter for an electronic controller such as ECU or ESC, and a rotational speed detection sensor 34 for obtaining the rotational speed of the output shaft 22 is provided to supply a speed meter with a signal representing the vehicle speed.

In the above-described type of vehicle automatic transmission having a planetary gear unit, a helical gear is ordinarily used as the planetary pinion of the planetary gear unit in consideration of reduction of noise.

Recently, with the development of large and/or high-performance vehicles, a need for improving automatic transmissions with planetary gear units, e.g., increasing the speed change gear ratio, has arisen. To do so, it is necessary to increase the capacity of the planetary gear unit and, hence, to increase the size of the planetary pinion.

A type of planetary pinion 17 having axial cross sections symmetrical in the direction of its rotation axis may be used in the overdrive planetary gear unit 13, as shown in FIG. 2. Since the planetary pinion 17 is constituted by a helical gear as mentioned above, it receives a reaction force $f_{R0}$ from the ring gear 21 to produce a reaction force $f_{R1}$ in the axial direction of the planetary pinion 17, as shown in FIG. 3, during the operation of the planetary pinion 17, that is, when a torque is input to the carrier to rotate the ring gear 21 by the rotation and revolution of the planetary pinion 17 and to thereby obtain an output from the ring gear 21. On the other hand, the planetary pinion 17 receives a reaction force $f_{S0}$ from the sun gear 19, and a reaction force $f_{S1}$ is produced in the axial direction of the planetary pinion 17, as shown in FIG. 4. Consequently, the direction of a reaction $f_2$ resulting from the forces received by the planetary pinion 17 from the ring gear 21 and the direction of a reaction force $f_3$ resulting from the forces received by the planetary pinion 17 from the sun gear 19 are opposite to each other, as shown in FIG. 5.

The reaction forces $f_2$ and $f_3$ cancel out each other because the magnitudes of these forces are equal and these forces act in opposite directions. There is therefore no possibility of the planetary pinion 17 from moving in the axial direction. However, the reaction forces $f_2$ and $f_3$ have different points of action, and therefore causes a clockwise torque. That is, the planetary pinion 17 receives a clockwise moment M, as shown in FIG. 6. A force $f_{MF}$ is thereby applied to a front bearing 102 interposed between the planetary pinion 17 and the pinion shaft 101, while a force $f_{MR}$ is applied to a rear bearing 103 interposed therebetween.

On the other hand, equal centrifugal forces $f_C$ produced by the revolution of the planetary pinion 17 are applied to the front and rear bearings 102 and 103 in the same direction. Since the direction of application of the force $f_{MF}$ to the front bearing 102 and the direction of application of the force $f_{MR}$ to the rear bearing 103 are opposite to each other, the centrifugal force $f_C$ and the force $f_{MR}$ applied to the rear bearing 103 cancel out each other and the load imposed upon the rear bearing 103 is therefore small, but the magnitudes of the centrifugal force $f_C$ and the force $f_{MF}$ applied to the front bearing 102 are added to each other and the load imposed upon the front bearing 102 is therefore large.

Where the gear ratio of the overdrive planetary gear unit 13 is increased, the above-mentioned clockwise moment is further increased. Accordingly, the load imposed upon the front bearing 102 becomes much larger than that imposed upon the rear bearing 103. Because the load upon one of the bearings is increased in this manner, there is a possibility of occurrence of pitching.

With respect to the planetary pinion 23 of the front planetary gear unit 14, a similar phenomenon takes place but the relationship between the relating forces is reverse to that in the case of the overdrive planetary gear unit 13. That is, the load imposed upon a rear bearing which supports the planetary pinion 23 is larger than that imposed upon a from... ...ing which also supports this gear.

This mechanism relating to the planetary pinon 23 of the front planetary gear unit 14 will be described below in detail with reference to FIGS. 7 to 10.

The planetary pinion 23 is also constituted by a helical gear. In a case where the brake B1 is actuated while the clutch C1 is engaged and the clutch C2 is disengaged, and where a torque is input through the ring gear 26 to rotate the planetary pinion 23 while revolving the same to output a torque through the carrier 24 and the output shaft 22, the planetary pinion 23 receives a reaction force $f_{RO}'$ from the ring gear 26, and a reaction force $f_{R2}$ is produced in the axial direction of the planetary pinion 23, as shown in FIG. 7. On the other hand, the planetary pinion 23 receives a reaction force $f_{SO}'$ from the sun gear 25a, and a reaction force $f_{S2}$ is produced in the axial direction of the planetary pinion 23, as shown in FIG. 8. Consequently, the direction of a reaction $f_4$ resulting from the forces received by the planetary pinion 23 from the ring gear 26 and the direction of a reaction force $f_5$ resulting from the forces received by the planetary pinion 23 from the sun gear 25a are opposite to each other, as shown in FIG. 9.

The reaction forces $f_4$ and $f_5$ cancel out each other because the magnitudes of these forces are equal to each other and these forces act in opposite directions. There is therefore no possibility of the planetary pinion 23 from moving in the axial direction. However, the reaction forces $f_4$ and $f_5$ have different points of action, and therefore causes a counterclockwise torque. That is, the planetary pinion 23 receives a clockwise moment M', as shown in FIG. 10. A force $f_{MF}'$ is thereby applied to a front bearing 202 interposed between the planetary pinion 23 and the pinion shaft 201, while a force $f_{MR}'$ is applied to a rear bearing 203 interposed therebetween.

On the other hand, equal centrifugal forces $f_C'$ produced by the revolution of the planetary pinion 23 are applied to the front and rear bearings 202 and 203 in the same direction. Since the direction of application of the force $f_{MF}'$ to the front bearing 202 and the direction of application of the force $f_{MR}'$ to the rear bearing 203 are opposite to each other, the centrifugal force $f_C$ and the force $f_{MF}'$ applied to the front bearing 202 cancel out each other and the load imposed upon the front bearing 202 is therefore small, but the magnitudes of the centrifugal force $f_C'$ and the force $f_{MR}'$ applied to the rear bearing 203 are added to each other and the load imposed upon the rear bearing 203 is therefore large.

SUMMARY OF THE INVENTION

It is an object of the present invention to provide an automatic transmission planetary gear unit in which the degree of non-uniformity of the load imposed upon the bearings for a planetary pinion, which non-uniformity is exhibited in the axial direction of the pinion, is reduced to improve the durability of the bearings, and which is therefore free from the above-described problem.

To achieve this object, according to the present invention, there is provided an automatic transmission comprising at least one planetary gear unit through which power from a drive source is output while changing the output speed, the planetary gear unit including: a pinion shaft fixed to and supported on a carrier; a bearing disposed around an outer circumference of the pinion shaft; a helical planetary pinion rotatably supported on the bearing, the planetary pinion having an axial-direction cross section asymmetrical in the direction of its rotation axis such that its center of gravity is shifted toward one of its axial ends to uniformize the load imposed upon the bearing with respect to the axial direction of the pinion shaft; and a sun gear and a ring gear each meshing with the planetary pinion.

That is, in an overdrive planetary gear unit, a helical planetary pinion has its front end portion reduced in volume as compared with its rear end portion to form an cutout portion and to have an axial-direction cross section asymmetrical in the direction of its rotation axis (extending to the left or right as viewed in the drawings) in order to uniformize, in the axial direction, the load imposed upon a bearing disposed around the circumference of the pinion shaft.

In a front planetary gear unit of a main transmission, a helical planetary pinion has its rear end portion reduced in volume as compared with its front end portion to form an cutout portion and to have an axial-direction cross section asymmetrical in the direction of its rotation axis (extending to the left or right as viewed in the drawings) in order to uniformize the load imposed upon a bearing disposed around the circumference of the pinion shaft.

Consequently, in accordance with the present invention, it is possible to reduce the weight of each planetary pinion and, hence, the centrifugal force acting on the pinion. Since the center of gravity of the planetary pinion is shifted toward one of the axial ends of the pinion, the load imposed upon the bearing can be uniformized in the axial direction thereof.

BRIEF DESCRIPTION OF THE DRAWINGS

FIG. 12 is a diagram of the operations of frictional engagement elements of the automatic transmission shown in FIG. 11.

DESCRIPTION OF THE PREFERRED EMBODIMENTS

Embodiments of the present invention will be described below in detail with reference to the accompanying drawings.

Figure 1:
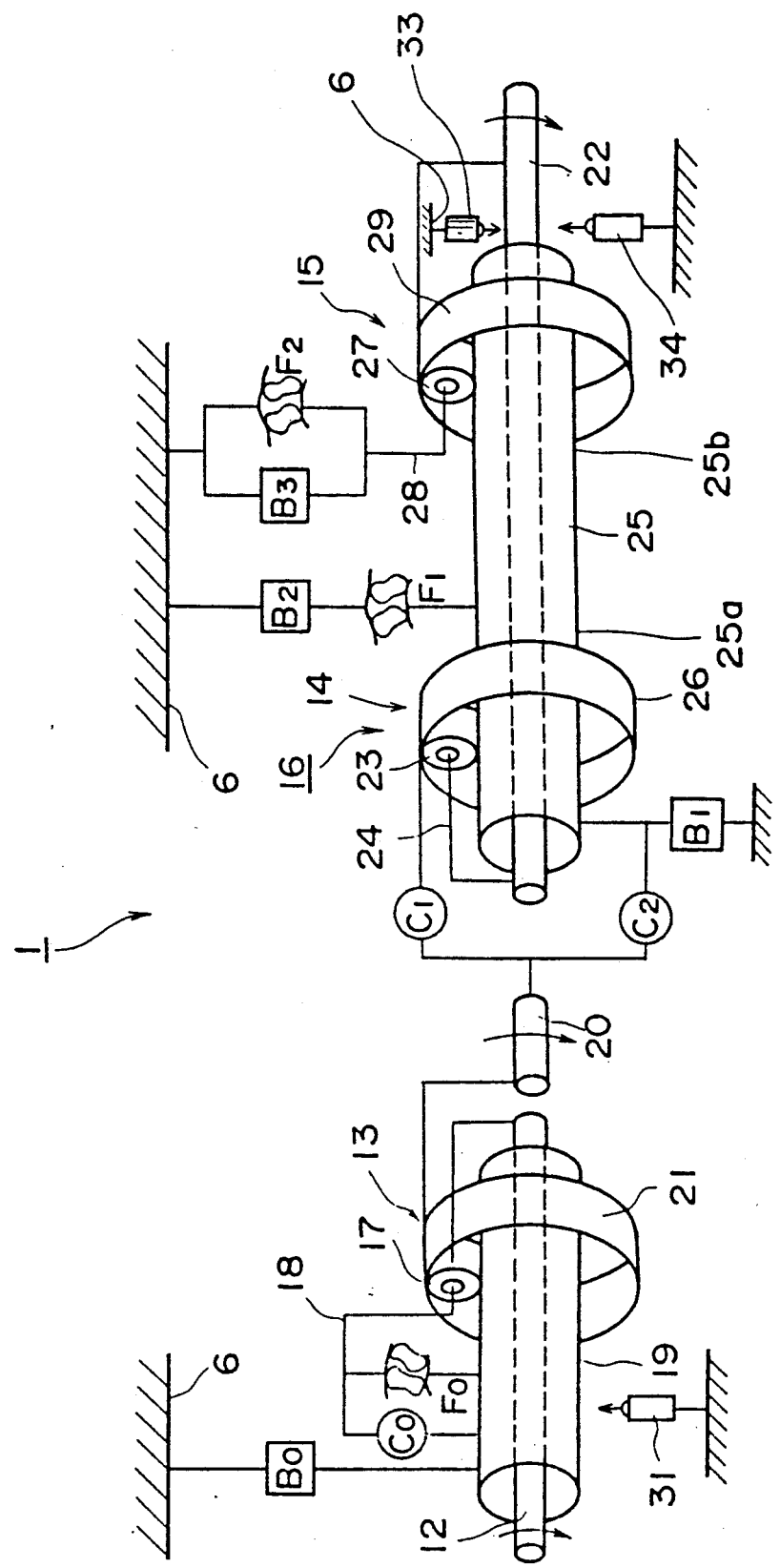
FIG. 1 is a schematic diagram of an automatic transmission relating to the present invention.
Figure 2:
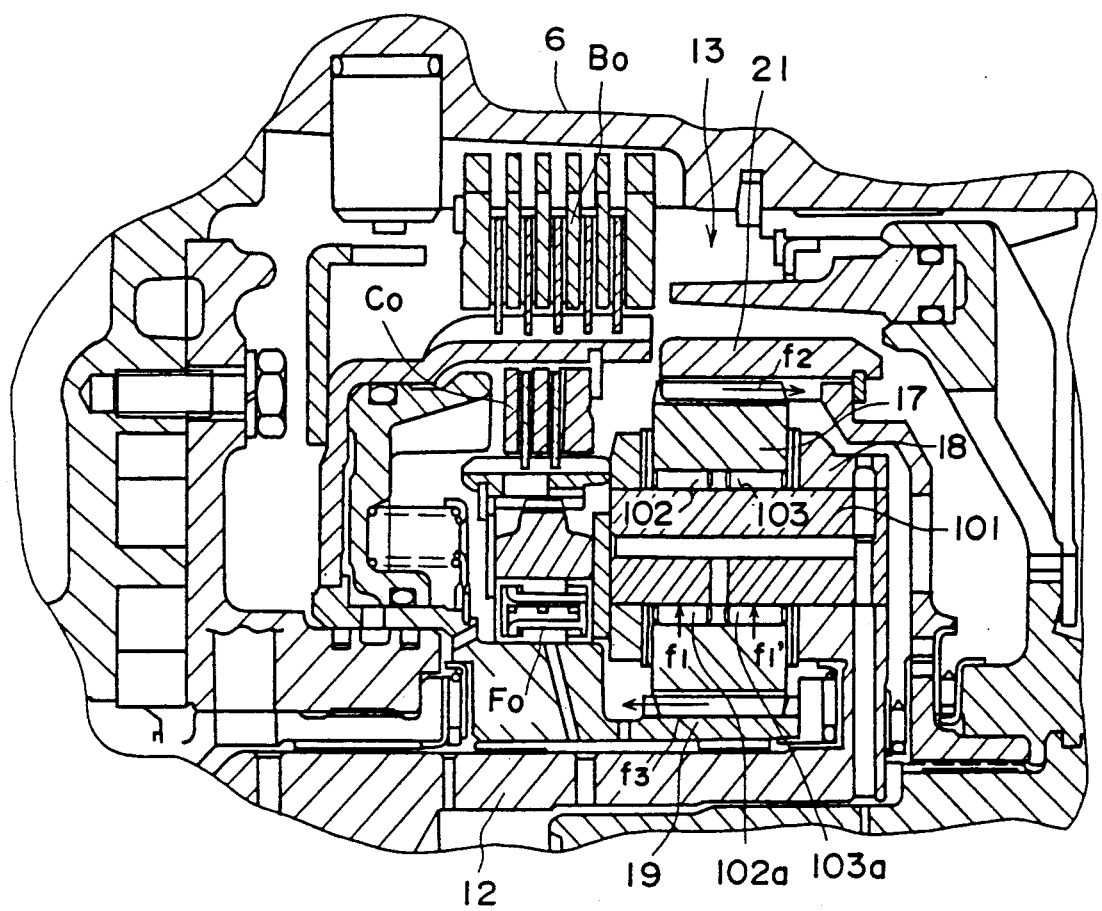
FIG. 2 is a cross-sectional view of a portion of a planetary gear unit of a conventional automatic transmission.
Figure 3:
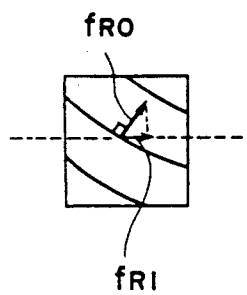
FIG. 3 is a diagram showing a reaction force applied from a ring gear to a planetary pinion of the overdrive planetary pinion gear unit of the conventional automatic transmission shown in FIG. 2.
Figure 4:
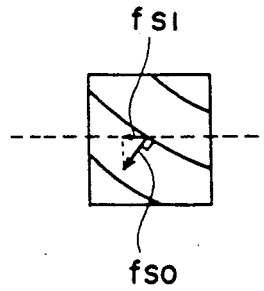
FIG. 4 is a diagram showing a reaction force applied from a sun gear to the planetary shown in FIG. 2.
Figure 5:
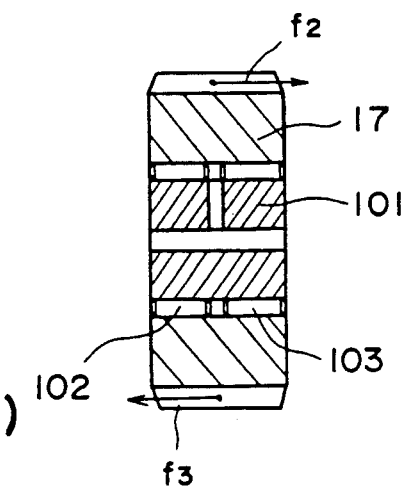
FIG. 5 is a diagram showing reaction forces applied to the planetary pinion shown in FIG. 2.
Figure 6:
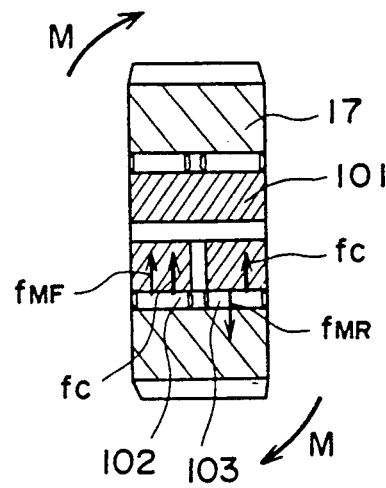
FIG. 6 is a diagram showing loads imposed upon the bearing for the planetary pinion shown in FIG. 2.
Figure 7:
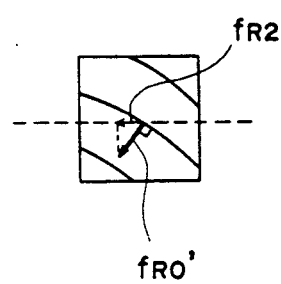
FIG. 7 is a diagram showing a reaction force applied from a ring gear to a planetary pinion of a planetary pinion gear unit of a main transmission unit of the conventional automatic transmission.
Figure 8:
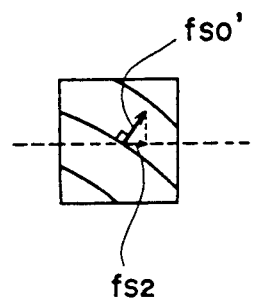
FIG. 8 is a diagram showing a reaction force applied from a sun gear to the planetary pinion of FIG. 7.
Figure 9:
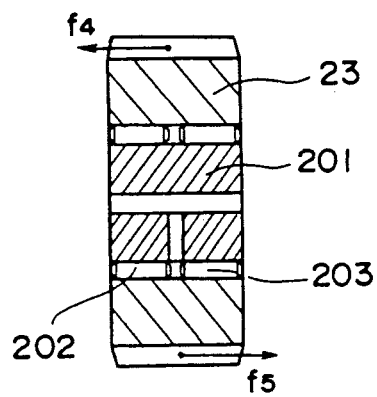
FIG. 9 is a diagram showing reaction forces applied to the planetary pinion of FIG. 7.
Figure 10:
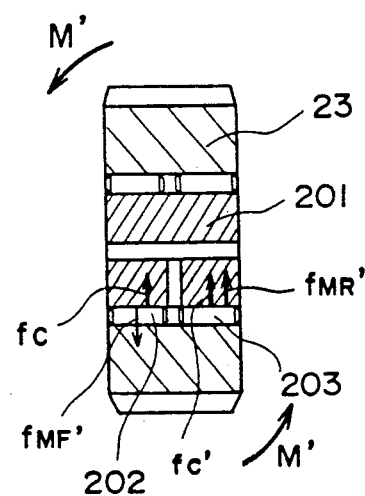
FIG. 10 is a diagram showing loads imposed upon the bearing for the planetary pinion of FIG. 7.
Figure 11:
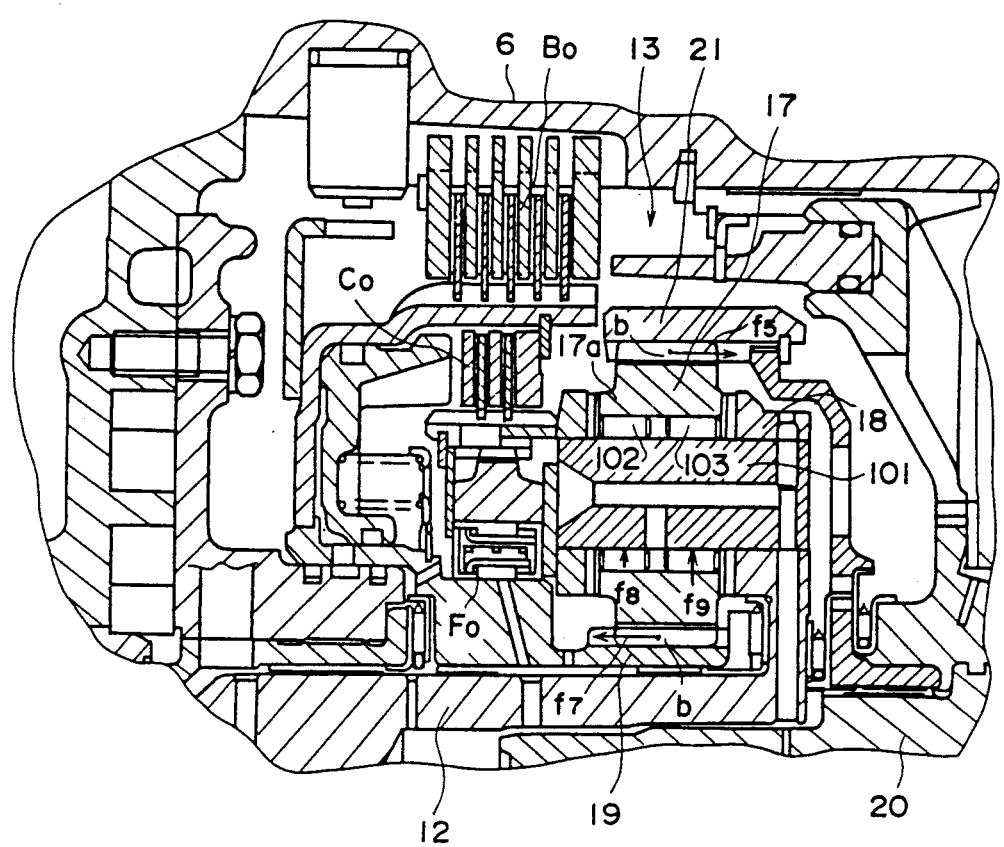
FIG. 11 is a cross-sectional view of an overdrive planetary gear unit of an automatic transmission which represents an embodiment of the present invention, showing essential portions of the same.

Referring to FIG. 11, an outer front end portion of a generally cylindrical planetary pinion 17 of the overdrive planetary gear unit 13 is cut to form a cutout portion 17a, so that axial cross sections of the planetary pinion 17 are asymmetric in the direction of the rotation axis of the planetary pinion 17 (extending to the left or right as viewed in FIG. 11). The planetary pinion 17 is rotatably supported by a pair of front and rear bearings 102 and 103 on a pinion shaft 101 fixed to and supported on a carrier 18. Each of the pair of bearings 102 and 103 has a circular cross section, and spherical rollers or needle rollers are provided between the outer circumferential surface of the pinion shaft 101 serving as an inner ring (inner race) and the inner circumferential surface of a bore formed in the planetary pinion 17.

The weight of the planetary pinion 17 is reduced by the formation of the cutout portion 17a based on cutting the outer front end portion of the generally cylindrical planetary pinion 17. The centrifugal force acting on the planetary pinion 17 is thereby reduced. Also, the center of gravity of the planetary pinion 17 is shifted toward the rear end of the pinion. The centrifugal force applied to the rear bearing 103 is therefore larger than that applied to the front bearing 102. That is, f8<f9. The load imposed upon the front bearing 102 is thereby reduced.

On the other hand, as mentioned above, the centrifugal force acting on the planetary pinion 17 is ordinarily increased as the size of the planetary pinion 17 is increased, resulting in an increase in the load upon the rear bearing 103. However, the centrifugal force applied to the rear bearing 103 is cancelled out with the reaction forces from the ring gear 21 and the sun gear 19, and the load imposed upon the rear bearing 103 is therefore small. There is therefore no risk of the durability of the bearing 103 being reduced.

The planetary pinion 17 may be modified in different ways as described below with reference to FIGS. 13 to 15.

Figure 13:
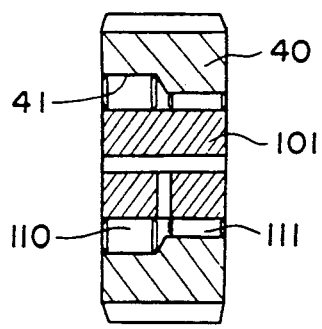
FIGS. 13 to 15 are cross-sectional views of modified examples of the planetary pinion of the overdrive planetary gear unit of the automatic transmission shown in FIG. 11.

Referring to FIG. 13, a cutout portion 41 is formed in a planetary pinion 40 in such a manner that a portion of the bore for receiving the front bearing is increased in diameter. A front bearing 110 having a diameter larger than that of a rear bearing 111 is fitted to the cutout portion 41.

Figure 14:
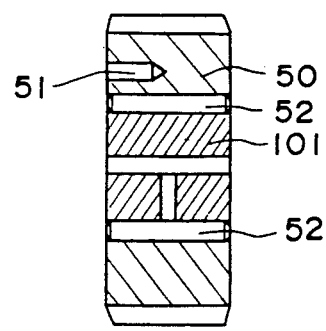
Figure 15:
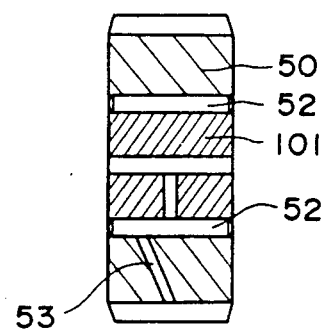

Referring then to FIG. 14, bore-like cutout portions 51 are formed in a front end portion of a planetary pinion 50. A single bearing 52 consisting of needle rollers which extend from the front side to the rear side is provided instead of the above-described separate front and rear bearings. Alternatively, as shown in FIG. 15, cutout portions 53 may be formed which serve as lubrication oil passages, while the same bearing as the single bearing 52 shown in FIG. 14 is used.

Each of these arrangements ensures that the distribution of loads imposed upon the bearing can be made uniform in the axial direction.

The operation of the thus-constructed automatic transmission will be described below.

The operations of the clutches $C_0$, $C_1$, $C_2$ and the brakes $B_0$, $B_1$, $B_2$, $B_3$ provided as frictional engagement elements are controlled in accordance with the operation table of FIG. 12 with respect to shift steps corresponding to operational ranges P, R, R ($V \geq 9$), N, D, 2nd, and L.

Engaged or released states of each of the one-way clutches $F_0$, $F_1$, and $F_2$ with respect to the shift steps are as shown in FIG. 12.

The operations of the clutches $C_0$, $C_1$, $C_2$ and the brakes $B_0$, $B_1$, $B_2$, $B_3$ are controlled with four solenoid valves provided in a hydraulic controller (not shown), and the operation is set to each range by operating a manual shift valve provided in the hydraulic controller.

First, the operation in the range D will be described below.

When the transmission operates at a first speed, the overdrive direct clutch $C_0$ and the forward clutch $C_1$ are respectively engaged, while the other clutches and brakes are controlled to be maintained in released conditions. Accordingly, the overdrive planetary gear unit 13 is maintained in a directly connected condition based on the connection through the overdrive direct clutch $C_0$, and the torque of the input shaft 12 is thereby transmitted to the input shaft 20 of the main transmission unit 16 without being changed in speed. In the main transmission unit 16, the torque of the input shaft 20 is transmitted to the ring gear 26 of the front planetary gear unit 14 through the forward clutch $C_1$ and to the carrier 24 and the output shaft integrally connected to the carrier 24 while applying a counterclockwise torque to the carrier 28 of the planetary gear unit 15 through the sun gear 25b. However, the carrier 28 does not rotate because the one-way clutch $F_2$ inhibits the carrier 28 from rotating in this direction. As a result, the planetary gear 27 rotates to transmit power to the ring gear 29 integral with the output shaft 22. At this time, the one-way clutch $F_0$ operates to engage with respect to the rotation of the carrier 18. During coasting, the one-way clutch $F_2$ is set to a free condition.

When the transmission operates at a second speed, the overdrive direct clutch $C_0$, the forward clutch $C_1$ and the second brake $B_2$ are respectively engaged, while the other components are controlled to be maintained in released conditions. The overdrive planetary gear unit 13 is thereby maintained in the directly connected condition, and the torque of the input shaft 12 is transmitted to the input shaft 20 of the main transmission unit 16 without being changed in speed, as in the case of the first speed operation. In the main transmission unit 16, the torque of the input shaft 20 is transmitted to the ring gear 26 of the front planetary gear unit 14 through the forward clutch $C_1$ and to the carrier 24 while applying a counterclockwise torque to the sun gear 25a through the planetary pinion 23. However, the sun gear 25a does not rotate because the second brake $B_2$ is engaged and the one-way clutch $F_1$ inhibits the sun gear 25a from rotating in this direction. Consequently, the carrier 24 rotates to transmit second speed torque to the output shaft 22 through the front planetary gear unit 14 alone.

During coasting, the one-way clutch $F_1$ is set to a free condition.

When the transmission operates at third speed, the overdrive direct clutch $C_0$, the forward clutch $C_1$, the direct clutch $C_2$ and the second brake $B_2$ are respectively engaged, while the other clutches and brakes are controlled to be maintained in released conditions. The overdrive planetary gear unit 13 is thereby maintained in the directly connected condition, and the planetary gear unit 14 is maintained in an integrally and directly connected condition based on the engagement of the forward clutch $C_1$ and the direct clutch $C_2$, thereby transmitting the torque of the input shaft 20 to the output shaft 22 without changing the speed.

When the transmission operates at a fourth speed, i.e., the maximum speed range, the changeover control is such that the forward clutch $C_1$, the direct clutch $C_2$ and the second brake $B_2$ are respectively engaged, the overdrive clutch $C_0$ is disengaged and the overdrive brake $B_0$ is engaged while the other brakes are released.

In this state, the overdrive brake $B_0$ inhibits the sun gear 19 from rotating while the one-way clutch $F_0$ allows the carrier 18 to rotate. The torque of the carries 18 is therefore transmitted to the ring gear 21 and, hence, to the input shaft through the planetary pinion 17 while being increased in speed, so that the ring gear 21 and the input shaft 20 are in an overdrive condition. On the other hand, since the main transmission unit 16 is maintained in the directly connected condition, the overdrive torque of the input shaft 20 is transmitted to the output shaft 22 without being changes in speed, so that the output shaft 22 is also in an overdrive condition.

At the time of down-shifting from the fourth speed to the third speed, the overdrive direct clutch $C_0$ is engaged and the overdrive brake $B_0$ is released. At the time of third-second speed shifting, the direct clutch $C_2$ is released. At the time of second-first shifting, the second brake $B_2$ si released.

In a case where, during D range traveling, the transmission is down-shifted to the second speed by the manual valve operation effected by the driver, the timing of engagement of the second brake $B_1$ is advanced to prevent inertial operation of the transmission at the time of down-shifting and, hence, to eliminate a feeling of racing given to the driver.

Next, the operation in the range 2 will be described below. The operation in the range 2 is equal to that in the range D with respect to the first or third speed. Therefore it will not be described with respect to the first and third speeds.

When the transmission operates at the second speed, it is controlled to engage the second coast brake $B_1$ along with the forward clutch $C_1$, the overdrive direct clutch $C_0$ and the second brake $B_2$. In this state, since the brake $B_1$ is actuated, the sun gears 25a and 25b of the main transmission unit 16 are locked to effect engine braking.

In a case where the transmission is operated for an upshift from the first speed to the second speed, the timing of engagement of the second coast brake $B_1$ is delayed to prevent the second brake $B_2$ and the second coast brake $B_1$ from engaging simultaneously, thereby reducing the shock felt by the driver at the time of up-shifting.

The operation in the range L will be described below. The operation in the range L is equal to that in the range D with respect to the second speed. Therefore it will not be described with respect to the second speed.

When the transmission operates at the first speed, it is controlled to engage the 1st & Rev brake $B_3$ along with the forward clutch $C_1$, the overdrive direct clutch $C_0$. The carrier 28 of the rear planetary gear unit 15 is thereby locked to effect engine braking.

The operation in the range R will be described below.

The overdrive direct clutch $C_0$, the direct clutch $C_2$ and the brake $B_3$ are engaged the other clutches and brakes are maintained in released states. The overdrive planetary gear unit 13 is thereby directly connected, and the torque of the input shaft 12 is transmitted to the input shaft 21 without being changed in speed. In the main transmission unit 16, the torque of the input shaft 20 is directly transmitted to the sun gears 25a and 25b by the direct clutch $C_2$. Since the rear carrier 28 is locked to be inhibited from rotating, the torque of the sun gears 25a and 25b is transmitted to the ring gear 29 through the planetary pinion 27 as a reverse torque, thereby rotating the output torque in the reverse direction.

When the vehicle speed is higher than a certain speed, e.g., 9 km/h, the direct clutch $C_2$ cannot be engaged even by the manual valve operation to the range R position. The output shaft 22 is thereby prevented from rotating in the reverse direction when the vehicle travels at the predetermined speed.

Figure 16:
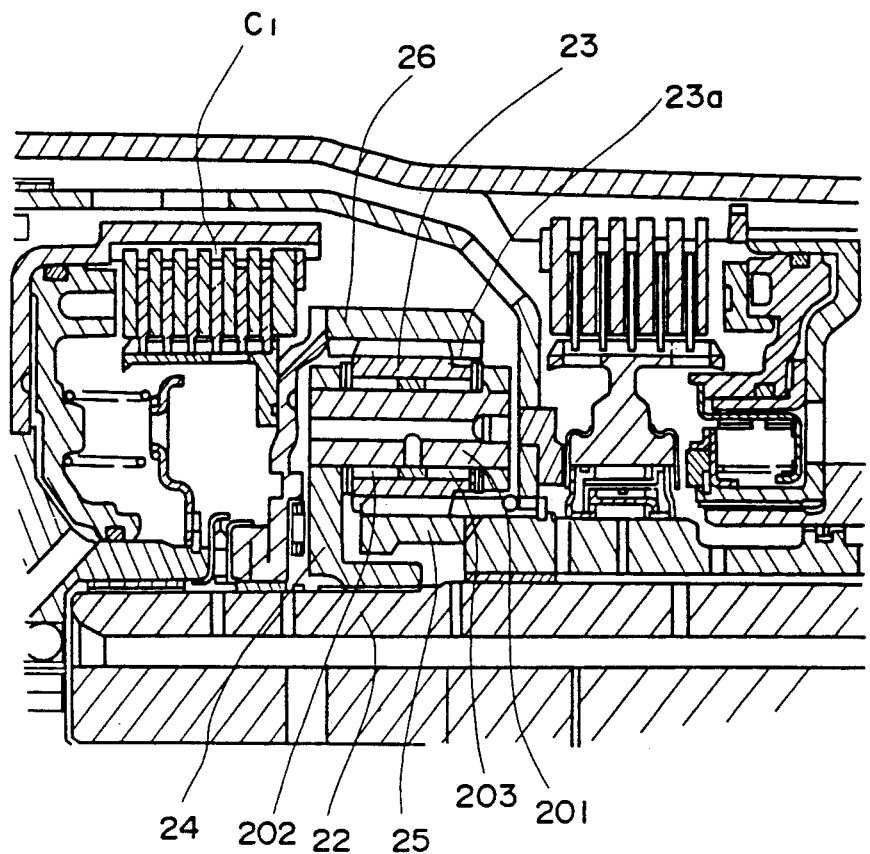
FIG. 16 is a cross-sectional view of a front planetary gear unit of a main transmission unit of an automatic transmission which represents another embodiment of the present invention, showing essential portions of the same.

FIGS. 16 illustrates in section essential portions of a front planetary gear unit of an automatic transmission which represents another embodiment of the present invention.

As shown in FIG. 16, the planetary pinion 23 of the front planetary gear unit 14 is also constituted by a helical gear. A pair of front and rear bearings 202 and 203 are disposed around a pinion shaft 201. A rear end portion of the planetary pinion 23 is cut to form a cutout portion 23a in order to reduce the load imposed upon the front bearing 202 which tends to be larger than the load imposed upon the rear bearing 203, as in the above.

The planetary pinion 23 may be modified in different ways as described below with reference to FIGS. 17 to 19.

Figure 17:
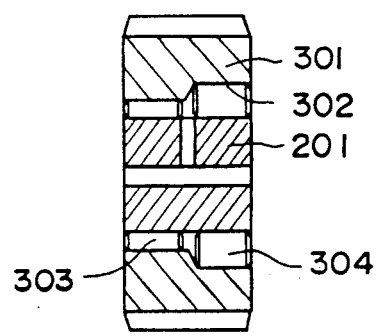
FIGS. 17 to 19 are cross-sectional views of modified examples of the planetary pinion of the front planetary gear unit of the main transmission unit of the automatic transmission shown in FIG. 16.

Referring to FIG. 17, a cutout portion 302 is formed in a planetary pinion 301 in such a manner that a portion of the bore for receiving the rear bearing is increased in diameter. A rear bearing 304 having a diameter larger than that of a front bearing 303 is fitted to the cutout portion 302.

Figure 18:
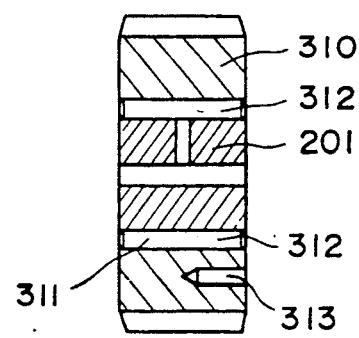
Figure 19:
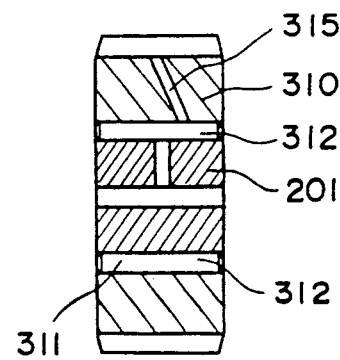

Referring then to FIG. 18, bore-like cutout portions 313 are formed in a rear end portion of a planetary pinion 310. A single bearing 312 consisting of needle rollers which extend from the front side to the rear side is provided instead of the separate front and rear bearings. Alternatively, as shown in FIG. 19, cutout portions 315 may be formed which serve as lubrication oil passages.

Each of these arrangements ensures that the distribution of loads imposed upon the bearing can be made uniform in the axial direction.

In the above-described embodiments, the present invention is applied to the overdrive planetary gear unit 13 or the front planetary gear unit 14. Needless to say, the present invention can be applied to other planetary gear units.

According to the present invention, as is apparent from the above description, the load imposed upon the bearing on which the pinion is supported can be made uniform in the axial direction, thereby improving the durability of the bearing.

It is to be understood that the present invention is not limited to the above-described embodiments and that various changes and modifications may be made in the invention without departing from the spirit and scope thereof.

What is claimed is:

1. An automatic transmission comprising at least one planetary gear unit through which power from a drive source is output while changing the output speed, said planetary gear unit including:
   (a) a pinion shaft fixed to and supported on a carrier;
   (b) a bearing disposed around the outer circumference of said pinion shaft;
   (c) a helical planetary pinion rotatably supported on said bearing, said planetary pinion having an axial-direction cross section asymmetrical in the direction of its rotational axis such that its center of gravity is shifted toward one of its axial ends to evenly distribute the load imposed upon said bearing along the axis of said pinion shaft; and
   (d) a sun gear and a ring gear each meshing with said planetary pinion.

2. An automatic transmission comprising at least one planetary gear unit through which power from a drive source is output while changing the output speed, said planetary gear unit including:
   (a) a carrier connected to an input shaft;
   (b) a pinion shaft fixed to and supported on said carrier;
   (c) a bearing disposed around the outer circumference of said pinion shaft;
   (d) a helical planetary pinion rotatably supported on said bearing, said planetary pinion having an axial-direction cross section asymmetrical in the direction of its rotational axis such that its center of gravity is shifted toward one of its axial ends to evenly distribute the load imposed upon said bearing along the axis of said pinion shaft; and
   (e) a sun gear and a ring gear each meshing with said planetary pinion.

3. An automatic transmission according to claim 2, wherein said planetary pinion is generally cylindrical, and an outer front end portion of said planetary pinion is reduced in volume as compared with an outer rear end portion of the same.

4. An automatic transmission according to claim 2, wherein said planetary pinion has holes formed in one end portion.

5. An automatic transmission according to claim 2, wherein said planetary pinion has holes formed as oil passages in one end portion.

6. An automatic transmission according to claim 2, wherein said bearing includes a front bearing and a rear bearing.

7. An automatic transmission according to claim 6, wherein a cutout portion is formed in said planetary pinion so that the space in which said front bearing is fitted is enlarged, and said front bearing fitted in said enlarged space has a diameter larger than that of said rear bearing.

8. An automatic transmission according to claim 2, wherein said bearing is constituted by a single bearing extending from one of said axial ends to the other axial end.

9. An automatic transmission comprising at least one planetary gear unit through which power from a drive source is output while changing the output speed, said planetary gear unit including:
   (a) a pinion shaft fixed to and supported on a carrier;
   (b) a bearing disposed around the outer circumference of said pinion shaft;
   (c) a helical planetary pinion rotatably supported on said bearing, said planetary pinion having an axial-direction cross section asymmetrical in the direction of its rotational axis such that its center of gravity is shifted toward one of its axial ends to evenly distribute the load imposed upon said bearing along the axis of said pinion shaft; and
   (d) a sun gear and/or a ring gear meshing with said planetary pinion and connected to an input member.

10. An automatic transmission according to claim 9, wherein said planetary pinion is generally cylindrical, and an outer front end portion of said planetary pinion is reduced in volume as compared with an outer rear end portion of the same.

11. An automatic transmission according to claim 9, wherein said planetary pinion has holes formed in one end portion.

12. An automatic transmission according to claim 9, wherein said planetary pinion has holes formed as oil passages in one end portion.

13. An automatic transmission according to claim 9, wherein said bearing includes a front bearing and a rear bearing.

14. An automatic transmission according to claim 13, wherein a cutout portion is formed in said planetary pinion so that the space in which said front bearing is fitted is enlarged, and said front bearing fitted in said enlarged space has a diameter larger than that of said rear bearing.

15. An automatic transmission according to claim 9, wherein said bearing is constituted by a single bearing extending from one of said axial ends to the other axial end.

* * * * *